United States Patent [19]

Norman

[11] 4,044,375
[45] Aug. 23, 1977

[54] BRIGHTNESS CONTROL APPARATUS

[75] Inventor: Marvin Neil Norman, Indianapolis, Ind.

[73] Assignee: RCA Corporation, New York, N.Y.

[21] Appl. No.: 715,851

[22] Filed: Aug. 19, 1976

[51] Int. Cl.$^2$ .................. H04N 9/535; H04N 5/58; H04N 5/18

[52] U.S. Cl. ...................... 358/40; 358/168; 358/172

[58] Field of Search .................... 358/39, 40, 168, 172

[56] References Cited

U.S. PATENT DOCUMENTS 3,804,981  4/1974  Avins .................................. 358/168

Primary Examiner—Robert L. Richardson
Attorney, Agent, or Firm—Eugene M. Whitacre; Ronald H. Kurdyla

[57] ABSTRACT

A brightness control circuit for a color television receiver including means for amplifying color representative signals (e.g., color difference signals) and means for amplifying luminance signals comprises a source of periodic keying signals occurring during blanking intervals of the luminance signals, and first and second keyed clamping networks. The first clamping network clamps the color representative signals to a first reference voltage in response to the keying signals, and the second clamping network clamps the blanking intervals of the luminance signals to a second reference voltage, representing a black tone of a reproduced image, in response to the keying signals. The first and second reference voltages are in predetermined relation and dependent upon the keying signals. An adjustable brightness control is coupled to the second clamping network for varying the second reference voltage level and therefore the black tone reference level and the brightness of a reproduced image.

13 Claims, 8 Drawing Figures

BRIGHTNESS CONTROL APPARATUS

This invention relates to brightness control apparatus for video signal processing systems and, more particularly, to such apparatus operatively associated with keyed clamping video signal processing circuits of a television receiver.

Because of the nature of a composite television signal in which a reference black level occurs periodically, so-called keyed clamps are often employed in television receivers to conduct during intervals associated with the reference level and thereby change a coupling capacitor so as to restore or provide a reference DC component to a signal coupled by the capacitor. Such keyed clamping circuits are shown, for example, in my U.S. Pat. No. 3,763,315 and in U.S. Pat. No. 3,927,255 granted to B. J. Yorkanis. A keyed clamping arrangement can also be employed in a kinescope driver stage for stabilizing the operating point and for establishing the blanking cut-off level of the driver stage, as described in U.S. Pat. No. 3,970,895 granted to D. H. Willis and U.S. Pat. No. 3,959,811 granted to R. L. Shanley, II.

The present invention relates to a brightness control arrangement suitable for use with video signal processing systems of the type described in the aforementioned U.S. patent of Willis.

In the design of a brightness control circuit for a television receiver, it is desirable to provide an accurate and reproducible range of control. Where a number of circuit elements and voltage sources are direct current coupled to an image reproducing device, tolerances of the values of the circuit elements and supplies must be taken into account in determining the operating range of the brightness control. It is therefore customary for brightness controls to be coupled across a relatively large voltage supply but, in operation in particular receiver, only a small range of the control is used. The sensitivity of such controls is typically undesirably limited because of the small actual operating range and, at the same time, they are undesirably costly because of high breakdown voltage (insulation) requirements.

The brightness control arrangement to be described herein desirably provides accurate and predictable operation such that the range of brightness control which can be provided by the viewer operated control is more readily determined for various operating conditions. In essence, the arrangement to be described exhibits relatively few circuit tolerances that require compensation, so that a reproducible range of brightness control is achieved.

In accordance with the present invention, brightness control apparatus is provided for a color television system including means for amplifying color representative signals, means for amplifying luminance signals having periodic blanking intervals and image intervals containing brightness information disposed between adjacent blanking intervals, and a color image reproducing device. A keying circuit provides periodic keying signals during the blanking intervals. The color representative signals are coupled to the color signal amplifying means via a first network, and the luminance signals are coupled to the luminance signal amplifying means via a second network. A first clamping circuit is coupled to the keying circuit and to the first coupling network, and is responsive to the keying signals for clamping the color representative signals to a first reference voltage. A second clamping circuit is coupled to the keying circuit and to the second coupling network for clamping the blanking interval portions of the luminance signals to a second reference voltage representing a black tone of a reproduced image. The first and second reference voltages are in predetermined relation and dependent upon the keying signals. An image brightness control device is coupled to the second clamping circuit for varying the second reference voltage and therefore the black tone reference level and brightness of a reproduced image.

Figure 1:
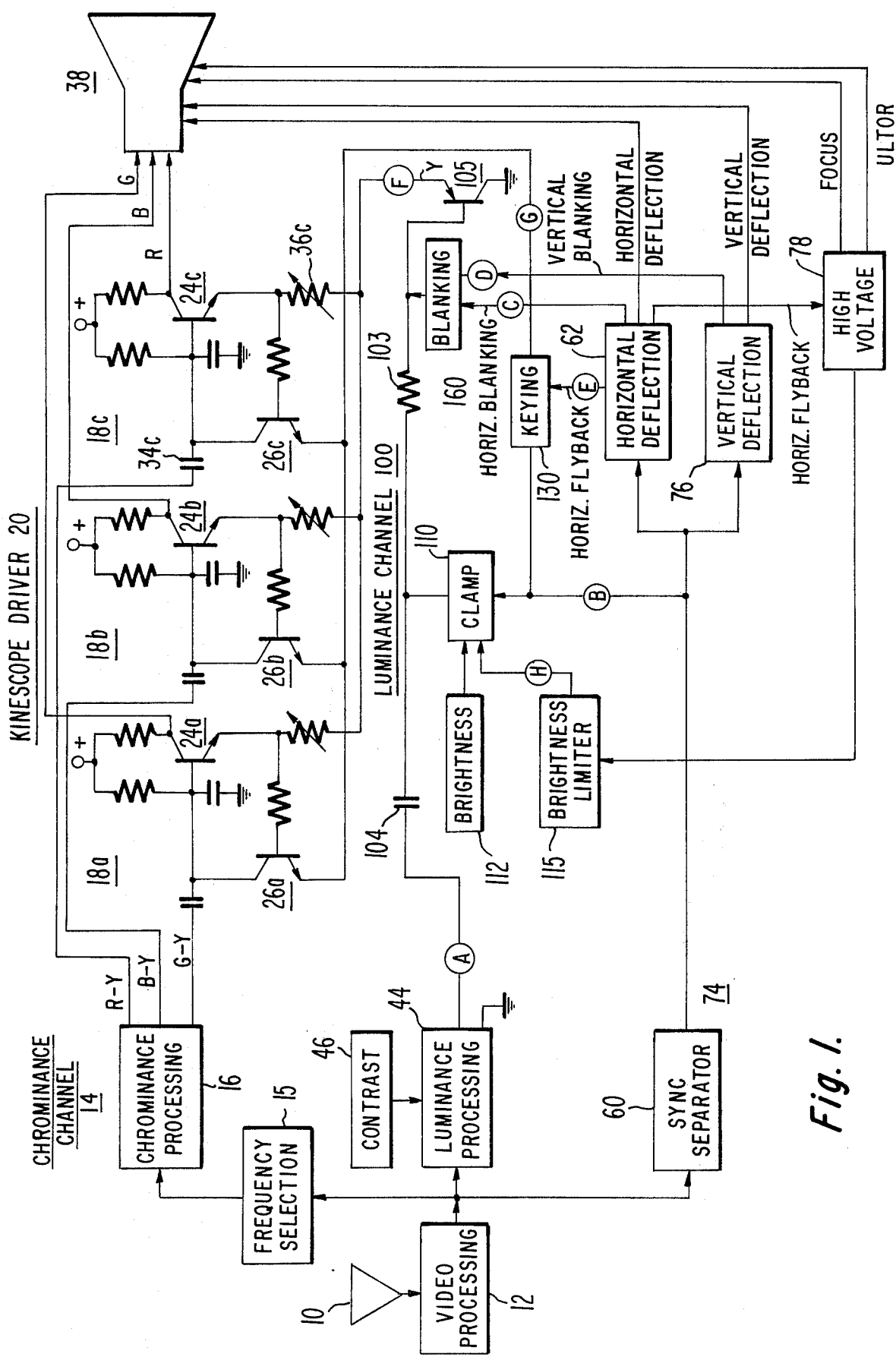
FIG. 1 shows, partially in block diagram form and partially in schematic circuit diagram form, a general arrangement of a color television receiver employing apparatus constructed in accordance with the present invention.

In FIG. 1, a video processing unit 12 is shown for receiving radio frequency (RF) signals from an antenna 10 and for translating these signals through intermediate frequency (IF) amplifying and detecting stages (not shown) to provide a composite video signal. The composite video signal comprises chrominance, luminance and synchronizing components.

A frequency selection unit 15 selectively couples the chrominance component to a chrominance channel 14, including a chrominance processing unit 16 for processing the chrominance component to derive R-Y, B-Y and G-Y color difference signals. The color difference signals are coupled to respective inputs of kinescope driver stages 18a, 18b and 18c of a kinescope driver unit 20. Kinescope driver stages 18a, 18b and 18c are similar and each include an amplifier transistor 24a, 24b and 24c, and a keyed bias transistor 26a, 26b and 26c, respectively, as described in the aforementioned U.S. Pat. No. 3,970,895. The kinescope driver stages combine a luminance output signal, Y, of a luminance channel 100 with the R-Y, B-Y and G-Y color difference signals to form R, B and G color signals. The R, B and G color signals are applied to cathode electrodes of a kinescope 38.

Figure 5:
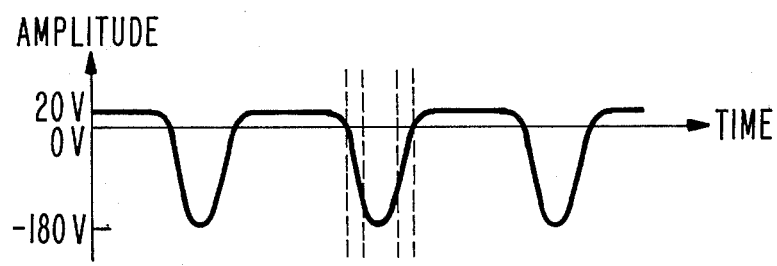
Figure 7:
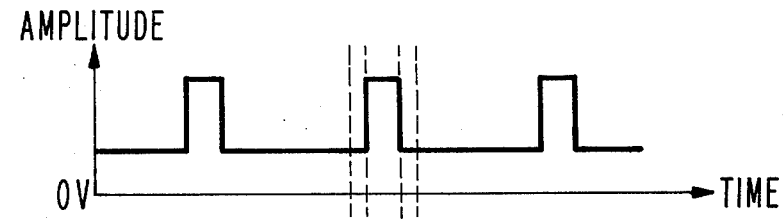

Video processing unit 12 is also coupled to a channel 74 for processing the synchronizing (sync) component of the video signal. A sync 60 derives periodic positive line sync pulses from the video signal. The derived sync pulses (FIG. 7) are in phase with the correspond to line sync of the video signal (FIG. 3) and are coupled to a horizontal deflection unit 62. Appropriate vertical sync pulses are also derived and are coupled to a vertical deflection unit 76. Periodic horizontal and vertical deflection signals are coupled from outputs of units 62 and 76 to appropriate deflection windings associated with kinescope 38. Horizontal deflection unit 62 also supplies negative-going periodic horizontal flyback pulses (FIG. 5) during the horizontal sync or retrace interval to a high voltage unit 78, and also provides high operating voltages for ultor and focus electrodes of kinescope 38.

Figure 6:
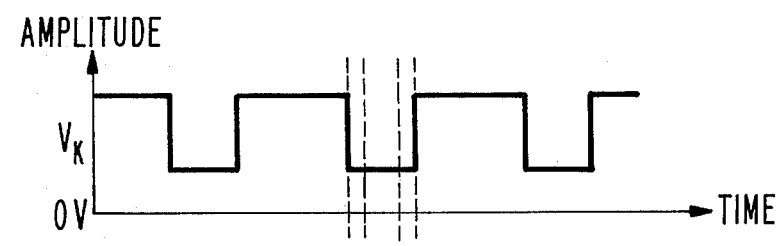

Horizontal deflection unit 62 further supplies horizontal flyback pulses to an input of a keying unit 130. Keying unit 130 generates periodic keying pulses (FIG. 6) during the horizontal retrace interval in response to and substantially coincident with the horizontal flyback pulses. The keying pulses control the operation of bias transistors 26a, 26b and 26c of kinescope driver stages 18a, 18b and 18c during the horizontal retrace interval as described in U.S. Pat. No. 3,970,895.

Figure 3:
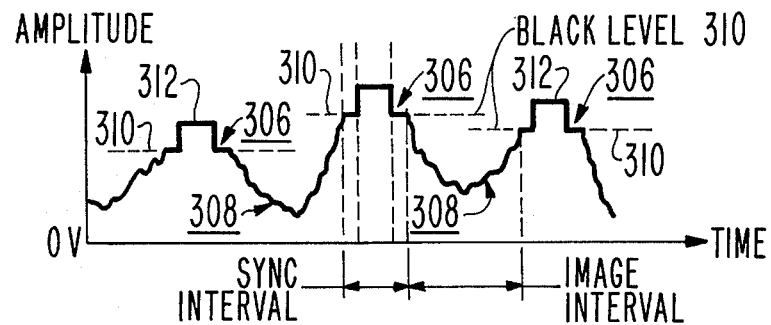
FIGS. 3-8 show time domain waveforms useful in understanding the arrangements of FIG. 1 and FIG. 2.

A luminance processing unit 44 of luminance channel 100 amplifies and otherwise processes the luminance component to provide a "sync tips positive" luminance output signal (FIG. 3). The luminance component from unit 44 comprises periodic blanking pulses 306 and signal portions 308 representing image information disposed between the blanking pulses. The blanking pulses are formed by a pedestal level 310 upon which are imposed sync pulses 312. Although the pedestal level 310 is generally considered to correspond to a blanking level of the kinescope, it is common to refer to this level as a black level, relating to a black tone of an image reproduced by the kinescope.

Figure 4:
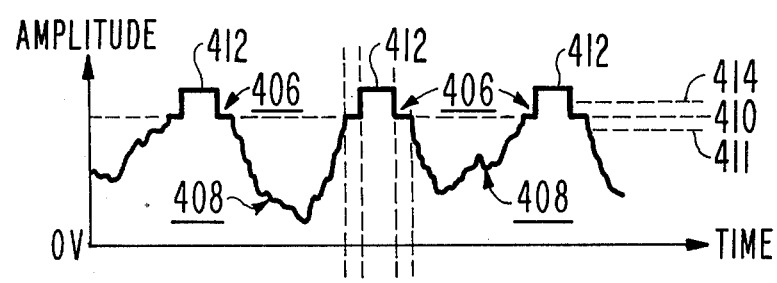
Figure 8:
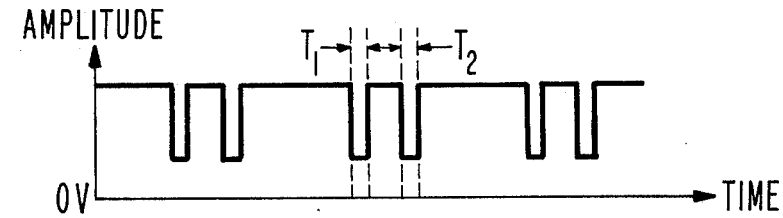

The luminance component shown by FIG. 3 is coupled from luminance processing unit 44 via a coupling capacitor 104 to a keyed black level clamping unit 110. The clamped luminance signal is coupled via a resistor 103 to a base electrode of a PNP luminance driver transistor 105. Periodic horizontal sync pulses (FIG. 7) from sync separator 60 and periodic keying pulses (FIG. 6) from gating unit 130 are combined to form a switching signal (FIG. 8) which controls the clamping (conduction) intervals of clamping unit 110. A clamped luminance component appearing at the junction of an output of clamping unit 110 and capacitor 104 is shown in FIG. 4.

Horizontal deflection unit 62 and vertical deflection unit 76 also supply periodic horizontal and vertical blanking pulses to a blanking unit 160 where they are amplitude limited and combined with the clamped luminance component to insure that kinescope 38 is substantially cut-off during the horizontal and vertical retrace intervals. The combined signal appears at the base electrode of luminance driver transistor 105.

Additional control of clamping unit 110 is accomplished by an automatic brightness limiter unit 115 and by a brightness control unit 112. Brightness unit 112 includes a manually adjustable, viewer operated control to vary the conduction of clamp 110 and to thereby obtain a desired level of brightness of an image reproduced by kinescope 38, as will be discussed in connection with FIG. 2. Brightness limiter 115 generates a voltage for controlling the conduction of clamping unit 110 to reduce the beam current of kinescope 38 when the current, as manifested by the current demand of high voltage unit 78, exceeds a predetermined maximum level. The operation of brightness limiter 115 is described in greater detail in my copending U.S. patent application Ser. No. 715,861, entitled, "Automatic Beam Current Limiter" and filed concurrently with the present application.

Figure 2:
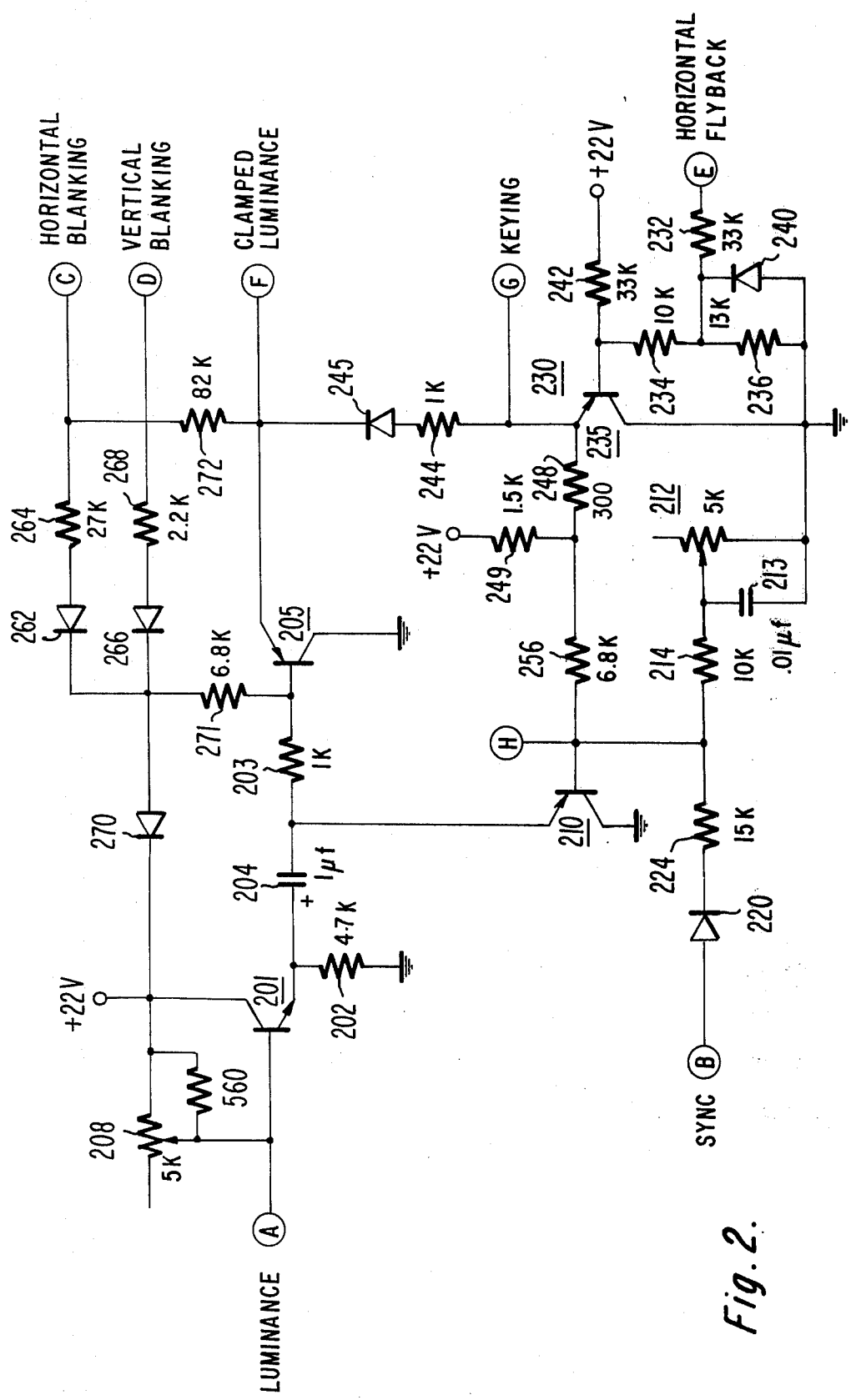
FIG. 2 shows a schematic circuit diagram of a portion of the arrangement of FIG. 1 constructed in accordance with the present invention.

Referring now to FIG. 2 together with FIG. 1, it is noted that reference terminals A-H of FIG. 2 correspond to reference terminals A-H of FIG. 1.

The luminance signal from luminance processor 44 is coupled to an emitter follower buffer transistor 201 via a terminal A. A viewer operated control 208 is operative to vary the amplitude of the luminance signal processed by transistor 201. An emitter output of transistor 201 is coupled to a bias resistor 202 and to a coupling capacitor 204 which is operatively associated with a PNP keyed level clamping transistor 210.

The black level of the luminance signal coupled via capacitor 204 is clamped to a reference level, representing a black tone of an image, when transistor 210 is rendered conductive in response to periodic keying pulses applied to a base electrode of transistor 210. The conduction intervals of transistor 210 are controlled in a first instance by first keying pulses (FIG. 6) from a keying circuit 230. As is described in detail in connection with a similar keying circuit shown in allowed U.S. patent application Ser. No. 580,688, now U.S. Pat. No. 3,984,864 issued on Oct. 5, 1976, of D. H. Willis, keying circuit 230 also serves to couple a signal which may be called an "extra blanking signal" via a resistor 244, a diode 245 and a terminal F to cut-off kinescope 38 during horizontal trace portions of each vertical retrace interval.

Keying circuit 230 comprises a PNP transistor 235 having an emitter output coupled to the emitters of keyed bias transistors 26a, 26b and 26c of kinescope driver 20 via a terminal G. The horizontal flyback voltage waveform generated by horizontal deflection unit 62 is coupled through a terminal E, a resistor 232 and a resistor 234 to a base of transistor 235. Negative amplitude excursions of the horizontal flyback pulse are limited by a diode 240 to prevent the development of excessive negative voltages at the junction of resistors 234 and 236. The amplitude limited flyback pulse is translated to a more positive DC level by a network including resistors 234, 236 and a resistor 242 coupled to a source of positive supply voltage (+22 v).

The first keying pulses appear at the emitter output of transistor 235 and are coupled to kinescope driver stages 18a, 18b and 18c via terminal G. The first keying pulses are also coupled to the base of clamping transistor 210 via a DC voltage translating network including a source of positive voltage (22 volts) and resistors 248, 249 and 256. The keying voltage level of the first keying pulses corresponds to the minimum level of the keying pulse waveform, $V_K$ in FIG. 6.

Second keying pulses (FIG. 7) for controlling the clamping intervals of transistor 210 are provided from sync separator 60 through a terminal B, a signal isolation diode 220 and an amplitude determining resistor 224. The first and second keying pulses are summed at the base of transistor 210 to form a combined keying signal (FIG. 8) having a keying voltage level corresponding to the minimum amplitude level of the combined keying signal waveform. It is noted that the second, positive sync, keying pulses serve to prevent transistor 210 from clamping to the level of the sync tip of the luminance signal, which may vary in amplitude and therefore adversely affect the clamping reference level provided by transistor 210.

A clamped luminance signal (FIG. 4) appearing at a junction of capacitor 204 and the emitter output of transistor 210 is coupled through resistor 203 to a base input of a PNP luminance driver transistor 205, which provides an amplified clamped luminance signal through terminal F to amplifier transistors 24a, 24b and 24c of kinescope driver 20. Horizontal and vertical blanking pulses from deflection units 62 and 76 have time durations respectively corresponding to the horizontal and vertical retrace intervals. The horizontal blanking pulses are in time synchronism with the negative portion of the horizontal flyback pulse waveform. Horizontal blanking pulses coupled through terminal C, a resistor 264 and a signal isolation diode 262, and vertical blanking pulses coupled through a terminal D, a resistor 268 and a signal isolation diode 266, are amplitude limited by a clamping diode 270 and coupled to the base of transistor 205 by a resistor 271.

A brightness control network comprising a variable resistor 212, a filter capacitor 213 and a resistor 214 serves to adjust the bias and therefore the level of conduction of keyed clamp transistor 210. Adjustment of resistor 212 varies the black level of the luminance signal and the brightness of a reproduced image.

The operation of the circuit of FIG. 2 will now be considered together with kinescope driver stage 18c of of FIG. 1 as a representative one of the kinescope driver stages. The combination of complementary transistors 205 and 24c serves to amplify and matrix the Y and R-Y signals to derive the R signal at a collector output of amplifier transistor 24c. As described in greater detail in U.S. Pat. No. 3,970,895 and the aforementioned U.S. patent application of Willis, amplifier transistor 24c and keyed bias transistor 26c are arranged in feedback relation, and the voltage developed at the emitter of transistor 24c is maintained substantially independent of the DC conditions of chrominance unit 16 and the base-emitter voltage variations of transistor 24c by a clamping network comprising a coupling capacitor 34c and keyed bias transistor 26c. The clamping network 34c, 26c also serves to establish the cut-off or blanking conduction level of amplifier transistor 24c and therefore that of kinescope driver stage 18c. Clamping action occurs when keyed transistor 26c conducts in response to the keying voltage $V_K$ of the first keying pulse during the horizontal flyback blanking interval, when the keying voltage level $V_K$ appears at the emitter of transistor 26c. A reference voltage related to the keying voltage $V_K$ then appears at the junction of coupling capacitor 34c, a collector of transitor 26c, and a base input of amplifier transistor 24c. The reference voltage serves to establish a desired direct voltage component of the color difference signal amplified by transistor 24c.

It is noted that the first keying pulse is employed both for keying clamping transistor 210 to establish the black or blanking level of the luminance signal, and for keying bias transistor 26c for establishing the blanking level of kinescope driver stage 18c. As discussed below, a predictable relationship exists between the voltage used for keying both clamping transistor 210 and bias transistor 26c during the blanking interval.

During the blanking interval, the keying voltage level $V_K$ of the first keying pulses appears at the emitter of transistor 235 and at the emitter of keyed bias transistor 26c of kinescope driver stage 18c via terminal G. A voltage then appearing at the emitter of amplifier transistor 24c of stage 18c is substantially equal to the keying voltage $V_K$ plus the base-emitter voltage (0.6 volts) of transistor 26c.

Also during the blanking interval, it is desired to render luminance driver transistor 205 non-conductive so that substantially no current flows in the base-emitter circuit of transistor 205 including resistor 203 and a variable bias control resistor 36c of stage 18c. The voltage ($V_K$ + 0.6) appearing at the emitter of transistor 24c therefore corresponds to the voltage appearing at the emitter of luminance driver transistor 205. In order to render transistor 205 non-conductive at this time, the base voltage of transistor 205 should substantially equal or exceed the keying voltage level $V_K$.

Neglecting for the moment the blanking pulses coupled to the base of transistor 205 via resistor 271, the voltage then appearing at the emitter of clamp transistor 210 corresponds to the base voltage of transistor 205, that is greater than or equal to $V_K$. Consequently, in order to render clamp transistor 210 conductive during blanking interval periods $T_1$ and $T_2$, a keying voltage applied to the base of transistor 210 should be of a magnitude correspondingly equal to or greater than the emitter voltage of transistor 210, $V_K$, less the base emitter voltage drop (0.6 volts) of transistor 210, or ($V_K$ − 0.6).

As described above, the keying voltage ($V_K$ − 0.6) to be applied to the base of clamp transistor 210 is directly related to keying voltage $V_K$ applied to the individual kinescope driver stages. An accurate, predictable range of brightness control can be achieved if keyed clamp transistor 210 and the keyed bias transistors (e.g., 26c) of the kinescope driver stages are referenced to the same potential, such as ground, or to separate stable reference potentials.

The relationship described above pertains to a keying voltage level for a nominal black level condition. The blanking pulses coupled via resistor 241 insure that luminance driver transistor 205 is cut-off during blanking intervals for all settings of brightness control 212, and do not upset the premise upon which such relationship is based. The blanking pulses also serve to maintain a desired voltage across capacitor 204. In this regard it is noted that signals coupled to clamping network 204, 210 from buffer transistor 201 can cause a voltage to be developed across capacitor 204 sufficient to cause transistor 210 to be cut-off during the blanking interval, by reverse biasing the emitter-base junction of transistor 210. The blanking pulses serve to prevent this condition by maintaining a differential voltage across capacitor 204 such that the emitter-base junction of clamp transistor 210 remains forward biased during the blanking interval. The values of resistors 203 and 271 are selected to provide a level of blanking current sufficient to recharge capacitor 204 rapidly in the presence of rapid changes of the amplitude of signals coupled to capacitor 204 via transistor 201.

The keying voltage level ($V_K$ − 0.6) for keying clamp transistor 210 is derived from the keying voltage level $V_K$ appearing at the emitter of transistor 235 by means of a voltage translating network including resistors 248, 249 and 256, and the associated +22 volt source. The combination of the +22 volt source and resistors 248, 249 serve as a voltage divider for translating the keying voltage level $V_K$ of the keying pulses appearing at the emitter of transistor 235 to a more positive level. The translated keying voltage level appears at the junction of resistors 248 and 249 and is reduced in magnitude by the voltage drop across resistor 256 to produce a keying voltage level greater than ($V_K$ − 0.6) at the base transistor 210. A keying voltage level greater than ($V_K$ − 0.6) is provided for reasons which will be explained subsequently.

Brightness adjustment is provided by adjusting the position of the wiper arm of variable resistor 212. Such adjustment alters the base bias of clamp transistor 210, thereby causing the conduction, and hence the clamping voltage, of transistor 210 to change. A corresponding change in the black level of the luminance component results.

The conduction of transistor 210 increases as the wiper arm of variable resistor 212 is adjusted from the extreme upper to the extreme lower position. When variable resistor 212 is set to the extreme lower position of zero ohms, transistor 210 exhibits maximum conduction such that the black reference level of the luminance component is clamped to a level (411 in FIG. 4) which corresponds to a condition of maximum desired image brightness. Conversely, when the wiper arm of variable resistor 212 is set at an extreme upper position, the conduction of transistor 210 decreases such that the black level is clamped to a level (414 in FIG. 4), which corresponds to a condition of reduced image brightness. In FIG. 4, level 410 corresponds to a condition of average brightness between a range of brightness indicated by levels 411 and 414.

The range of brightness control obtainable is related to the resistance values of variable resistor 212 and associated resistor 214, and to the values of resistors 248, 249 and 256. In this connection it is noted that in some cases it may be desirable to tailor the range of brightness control to provide a greater range of control in a "blacker-than-black" direction. This is accomplished in the present circuit by increasing the base voltage of clamp transistor 210 above the keying voltage level ($V_K - 0.6$) which produces a nominal black level, by an amount $V_A$ in a positive direction. The additional positive voltage, $V_A$, is provided by appropriately selecting the values of resistors 248, 249 and 256 of the voltage translating network. Thus, when the resistors of the voltage translating network are selected to increase the keying voltage level applied to the base of transistor 210 by an amount $V_A$ above the keying voltage level ($V_K - 0.6$) required for a nominal black level, a greater brightness control range results in the direction of "blacker-than-black" tones.

It is noted that undesired variations in the level of the keying signals do not adversely affect the operation of the color signal amplifier transistors of the kinescope driver stages. Considering stage 18c, for example, such transistor 26c, and the level of the clamped luminance signal from transistor 205, to change in the same direction. The latter two voltage levels tend to alter the conduction of amplifier transistor 24c in opposing directions, since they are applied to base and emitter electrodes of transistor 24c, respectively. Variations in the level of the keying signals are therefore nullified.

Although the invention has been described in terms of a specific circuit embodiment, it should be appreciated that other circuit arrangements may be devised by those skilled in the art without departing from the scope of the invention.

What is claimed is:

1. In a color television system including means for amplifying color representative signals, means for amplifying luminance signals having periodic blanking intervals and image intervals containing image brightness information disposed between adjacent ones of said blanking intervals, and a color image reproducing device, apparatus comprising:
    means fo providing periodic keying signals during said banking intervals;
    first means for coupling said color representative signals to said color signal amplifying means;
    first clamping means coupled to said keying means and to said first coupling means and responsive to said keying signals for clamping said color representative signals to a first reference voltage level;
    second means for coupling said luminance signals to said luminance signal amplifying means;
    second clamping means coupled to said keying means and to said second coupling means for clamping said blanking interval portions of said luminance signals to a second reference voltage level representative of a black tone of an image reproduced by said image reproducing device, said first and second reference voltage levels being in predetermined relation and dependent upon said keying signals; and
    image brightness controlling means coupled to said second clamping means for varying said second reference voltage level and therefore said black tone reference level and brightness of a reproduced image.

2. Apparatus according to claim 1 and further comprising:
    signal translating means coupled to said keying means and to second clamping means for translating said keying signals to a predetermined level relating to a predetermined black tone of a reproduced image.

3. Apparatus according to claim 2, wherein:
    said signal translating means translates said keying signals to a predetermined level relating to a blacker-than-black tone of a reproduced image.

4. Apparatus according to claim 1, wherein:
    said blanking intervals of said luminance signals each contain a sync signal; and
    wherein said apparatus further comprises:
    means for deriving said sync signal from said luminance signal and for coupling said sync signal to said second clamping means for rendering said second clamping means inoperative in response to said sync signal.

5. Apparatus according to claim 1, comprising:
    means for deriving blanking signals from luminance signals; and
    means for coupling said blanking signals to said luminance signal amplifying means to inhibit said luminance signal amplifying means during said blanking intervals, and for coupling said blanking signals to said second clamping means and to said second coupling means to assure the clamping operation of said second clamping means.

6. Apparatus according to claim 1, wherein:
    said first and second coupling means comprise alternating current coupling means.

7. Apparatus according to claim 6, wherein:
    said first clamping means comprises an active current conducting device having a main current conduction path coupled to said first coupling means and to color signal amplifying means, and an input coupled to said keying means;
    said second clamping means comprises an active current conducting device having a main current conduction path coupled to said second coupling means and to said luminance signal amplifying means, and an input coupled to said keying means; and
    said first and second coupling means each comprise a capacitance device.

8. Apparatus according to claim 7 and further comprising:
    a signal translating network having an input coupled to said keying means and an output coupled to said input of said second clamping means, for translating said keying signals to a predetermined level relating to a predetermined black tone of a reproduced image.

9. Apparatus according to claim 8, wherein:
    said color representive signals comprise a plurality of color difference signals;
    said means for amplifying said color signals comprises a plurality of means for amplifying separate ones of said color differnce signals; and said first clamping means comprises a plurality of active current conducting devices each respectively coupled to individual ones of said means for amplifying said color difference signals and arranged in feedback relation therewith.

10. Apparatus according to claim 9, wherein:

each of said amplifying means and said means for amplifying luminance signals respectively comprise first and second transistors of opposite conductivity type, the emitters of said first and second transistors being direct current coupled together, said color difference signals being coupled to a base of said first transistor by said first coupling means, a collector of said first transistor being coupled to said image reproducing device, and said luminance signals being coupled to a base of said second transistor by said second coupling means.

11. Apparatus according to claim 10, wherein:

said first clamping means each comprise a third transistor of like conductivity type to that of said first transistor, said third transistor having a base direct current coupled to said emitter of said first transistor, a collector direct current coupled to said base of said first transistor, and an emitter coupled to said keying means.

12. Apparatus according to claim 11, wherein:

said second clamping means comprises a fourth transistor having a collector-emitter path coupled to said second coupling means and to said base of said second transistor and having a base coupled to said output of said signal translating means.

13. Apparatus according to claim 12, wherein:

said signal translating network comprises a voltage network; and said brightness controlling means comprises a controllable resistance device.

* * * * *

UNITED STATES PATENT OFFICE
CERTIFICATE OF CORRECTION

PATENT NO. : 4,044,375

DATED : August 23, 1977

INVENTOR(S) : Marvin Neil Norman

It is certified that error appears in the above-identified patent and that said Letters Patent are hereby corrected as shown below:

Col. 1, line 13, "change" should read -- charge --.
Col. 2, line 50, "the" should read -- and --; line 51, "sync of" should read -- sync pulses of --. Col. 3, line 59, "operated control" should read -- operated contrast control --; line 64, "keyed level" should read -- keyed black level --.
Col. 6, line 18, the numeral "241" should read -- 271 --.
Col. 7, lines 33-34, "such transistor 26c, and the level of the clamped luminance" should read -- such variations cause the level of the clamped bias voltage from transistor 26c and the level of the clamped luminance --. Col. 10, lines 15-16, "a voltage network; and" should read -- a voltage divider network; and --.

Signed and Sealed this

Fourteenth Day of November 1978

[SEAL]

Attest:

RUTH C. MASON
Attesting Officer

DONALD W. BANNER
Commissioner of Patents and Trademarks